US008417640B2

(12) United States Patent
Luo et al.

(10) Patent No.: US 8,417,640 B2
(45) Date of Patent: Apr. 9, 2013

(54) SECURE LICENSE KEY METHOD AND SYSTEM

(75) Inventors: Zhonghai Luo, Toronto (CA); Bryan R. Goring, Milton (CA); Michael Shenfield, Richmond Hill (CA)

(73) Assignee: Research In Motion Limited, Waterloo (CA)

( * ) Notice: Subject to any disclaimer, the term of this patent is extended or adjusted under 35 U.S.C. 154(b) by 1718 days.

(21) Appl. No.: 11/261,594

(22) Filed: Oct. 31, 2005

(65) Prior Publication Data

US 2007/0100762 A1  May 3, 2007

(51) Int. Cl.
*G06Q 99/00* (2006.01)
(52) U.S. Cl. .......................................... 705/59
(58) Field of Classification Search ................ 705/59
See application file for complete search history.

(56) References Cited

U.S. PATENT DOCUMENTS

| | | | | |
|---|---|---|---|---|
| 5,138,712 | A * | 8/1992 | Corbin ............................. | 726/30 |
| 5,208,858 | A * | 5/1993 | Vollert et al. ................... | 380/43 |
| 5,673,316 | A * | 9/1997 | Auerbach et al. ............... | 705/51 |
| 6,453,416 | B1 * | 9/2002 | Epstein ........................ | 713/170 |
| 6,857,067 | B2 * | 2/2005 | Edelman ....................... | 713/155 |
| 6,898,706 | B1 | 5/2005 | Venkatesan et al. | |
| 2002/0029347 | A1* | 3/2002 | Edelman ....................... | 713/193 |
| 2002/0168089 | A1 | 11/2002 | Guenther et al. | |
| 2004/0109567 | A1* | 6/2004 | Yang et al. ..................... | 380/277 |
| 2004/0111315 | A1* | 6/2004 | Sharma et al. .................. | 705/11 |
| 2004/0131184 | A1 | 7/2004 | Wu et al. | |
| 2005/0049976 | A1* | 3/2005 | Yang .............................. | 705/67 |
| 2006/0053426 | A1* | 3/2006 | Dive-Reclus et al. ........ | 719/328 |

FOREIGN PATENT DOCUMENTS

| | | |
|---|---|---|
| EP | 1434119 A | 6/2004 |
| JP | 2005304093 A | 10/2005 |
| WO | 2004082201 | 9/2004 |
| WO | WO2004/107115 A2 * | 12/2004 |

OTHER PUBLICATIONS

DRM Specification Candidate Version 2.0—Jul. 16, 2004, Open Mobile Alliance, OMA-DRM-DRM-V2_0-20040716-C, 142 pages.*
ITU X.509 Series X: Data Networks and Open System Communications—Information technology—Open systems interconnection—The Directory: Public-key and attribute certificate frameworks, Mar. 2000, 141 pages.*
Joung et al. ("On Personal Data License Design and Negotiation", Proceedings of the 29th Annual International Computer Software and Applications Conference COMPSAC '05, IEEE, 2005, 6 pages).*
Extended European Search Report issued by the European Patent Office dated Feb. 2, 2006 for corresponding European Patent Application No. 05110218.4.

(Continued)

*Primary Examiner* — James D Nigh
(74) *Attorney, Agent, or Firm* — Gowling Lafleur Henderson LLP

(57) ABSTRACT

A secure license key solution provides software license keys for enabling and/or tracing use of software where a license key comprises a message encrypted by a private key and the public key for verifying the message according to asymmetric encryption techniques. The message and public key may be used by a software enabler (e.g. an installation wizard) to enable the software and/or create a secure tag for incorporating with an output of the software to uniquely the license of the software used to create the output. A license key management system may generate license keys for respective software licensees and comprise a database to store an association between respective software licensees and their license keys to identify the license associated with output obtained.

24 Claims, 3 Drawing Sheets

OTHER PUBLICATIONS

Menzes, a.J.; Oorschot, Van P.C.; Vanstone, S.A., "Handbook of Cryptography", Dec. 5, 2003, CRC Press, US, Boca Raton, FL, XP002362575, p. 25-p. 39.

Second Examination Report issued by the European Patent Office dated Mar. 16, 2007 for corresponding European Patent Application No. 05110218.4.

Office Action from the State Intellectual Property Office in China dated May 23, 2008 for corresponding Chinese Patent Application No. 200610172398.2 together with English translation.

Office Action issued by the Canadian Intellectual Property Office dated Aug. 31, 2009 for corresponding Canadian Patent Application No. 2,565,508.

European Examination Report issued by the European Patent Office dated Feb. 22, 2010 for corresponding European Patent Application No. 05110218.4.

Notice of Intent to Grant dated Nov. 4, 2011 issued from the European Patent Office for corresponding European Patent Application No. 05110218.4.

Indian Office Action issued by the Indian Intellectual Property Office dated Aug. 19, 2010 for corresponding Indian Patent Application No. 2358/DEL/2006.

Canadian Office Action issued by the Canadian Intellectual Property Office dated Jan. 18, 2011 for corresponding Canadian Patent Application No. 2,565,508.

\* cited by examiner

SECURE LICENSE KEY METHOD AND SYSTEM

FIELD

The present relates generally to computer software distribution and, more particularly, to a secure license key method and system.

DESCRIPTION OF THE RELATED ART

Software, particularly commercial software, is typically distributed from one entity to another in accordance with a software license. The license grants the user of the software particular rights. One manner of controlling use of the software in accordance with the terms of a license is to employ a license key that, when appropriately coupled with the licensed software, enables installation, execution and/or other aspects. For example, the licensed software to be installed is bundled with an automated software installation program or wizard and a license key verifier. During installation, the authenticity of the license key is verified and the licensed software installed in response. The license key may also be verified by the license key verifier upon start-up or other attempts to use the licensed software.

It is desirable that a license key solution be secure to prevent others from generating or verifying unauthorized but otherwise algorithmically valid license keys. Often, a same algorithm is used in a license key generator and corresponding verifier. Because normally the verifier is bundled in the software installer, a malicious programmer or hacker can easily determine such algorithm through reverse engineering to make his/her own generator with such algorithm to create as many keys as desired to impersonate valid licensees.

Further, it is desired that a license key solution be flexible so that a license key administrator (a person associated with the licensed software distribution who is responsible for administering the licensed key solution) can easily change required settings for license key generation and verification algorithms to classify or group license keys for different purposes.

It is also desired that a license key solution be easily managed and statistics and other details for same be accessible. For example, a license key administrator may require reports on license key related issues, such as how many license keys have been issued, how many licensees have been licensed, when the license key was generated, when the licensee was registered, and so on.

Licensed software may comprise development tools and applications useful for defining and/or publishing other software or output for use by others. Determining which licensed software created a particular output is also desirable.

Accordingly, there is a resulting need for a method and apparatus that addresses one or more of these issues.

BRIEF DESCRIPTION OF THE DRAWINGS

Embodiment(s) will now be described by way of example with reference to attached figures, wherein.

DETAILED DESCRIPTION

The present relates to a secure license key solution for distributing and/or for tracing use of software in a distributed computer system.

A secure license key solution generates software license keys for enabling and/or tracing use of software, where a license key comprises a message part encrypted by a private key and a public key part for verifying the message according to asymmetric encryption techniques. The message and public key may be used by a software enabler (e.g. an installation wizard) to enable the software and/or create a secure tag for incorporating with an output of the software to identify the license for the software which created the output. A license key management system may generate license keys and comprise a database to store an association between respective software licensees and the license keys to trace the origin to a particular license of the software which created the output obtained. The software to be licensed may comprise an integrated development environment for programming and outputting other software for example. The other software output may be bundled with the secure tag and published for use by others. This output may be obtained and its origin traced (e.g. the associated license identified) using the secure tag.

The license key management system may be adapted to generate management reports etc. and to configure license key generation in accordance with desired encryption techniques.

Persons of ordinary skill in the art will recognize computer system, method, computer program product and other aspects from the embodiment(s) shown and described.

Figure 1:
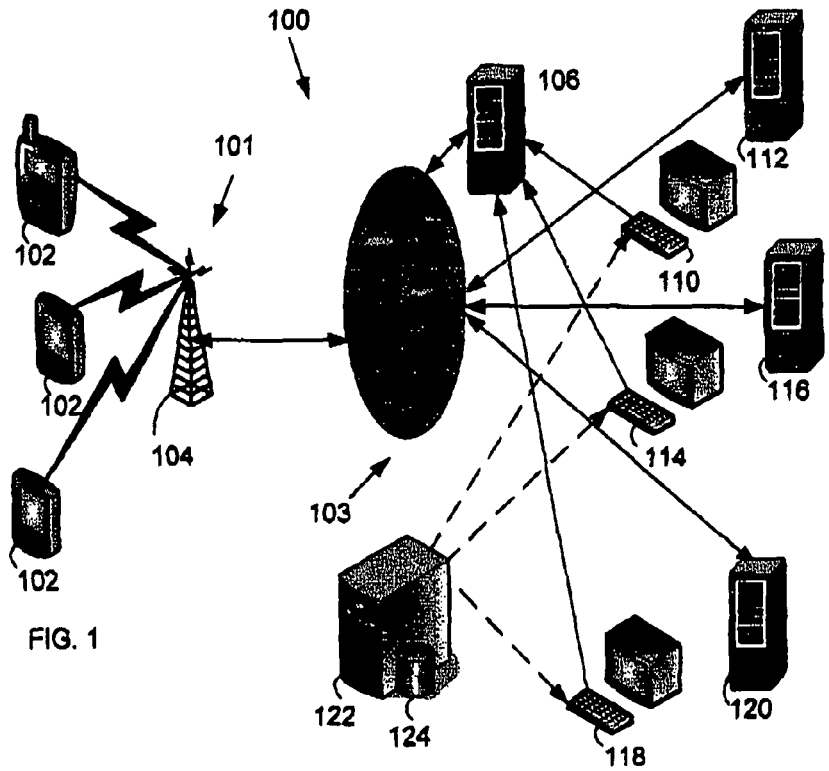
FIG. 1 is a block diagram which illustrates one embodiment of a distributed computer system including wireless and wire-line communication networks.

FIG. 1 is a block diagram showing a distributed computer system 100 comprising a plurality of computing devices coupled for communication via wireless and wire-line communication networks 101 and 103. System 100 comprises wireless mobile devices 102 (e.g. smart phones, PDAs and the like), wireless network equipment 104, a component application repository 106, wireless component application gateway system 108, a plurality of data sources 112, 116, 120, software development stations 110, 114 and 118, and a license key generating and verifying system 122 including a secure data store 124.

Figure 2:
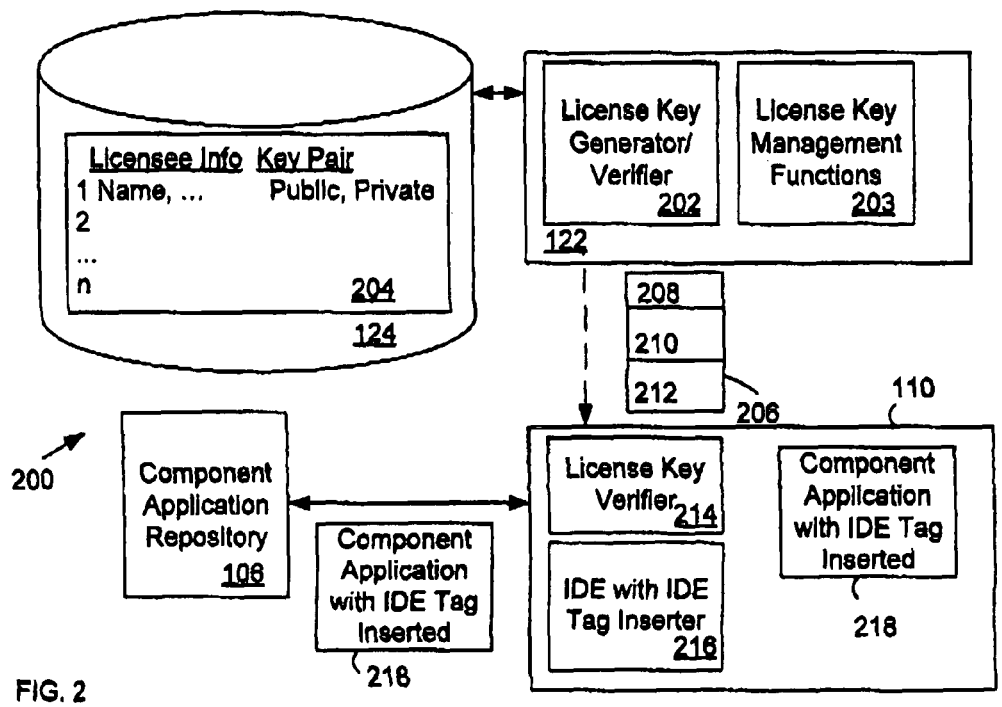
FIG. 2 is a block diagram showing selected components of FIG. 1 in greater detail and comprising an embodiment of an external license key useful in the distributed computer system of FIG. 1.

In brief and with additional reference to FIG. 2, computer system 100 is adapted to facilitate data communications between mobile devices 102 and data sources 112, 116 and 120 using component applications (e.g. 218) developed by software development stations (e.g. 110, 114 and 118) and published to the repository 106. Software development stations 110, 114 and 118 comprise software development tools such as an integrated development environment (IDE) (e.g. 216 of station 110) configured for programmers to produce component applications comprising a secure IDE tag 218. The secure IDE tag is useful for identifying the license for software used to create the component application. Instances of the IDE (e.g. 216) are distributed by or on behalf of a providing entity to others (i.e. "licensees") desiring to develop component applications. Enablement of the IDEs is under the control of respective secure license keys (e.g. 206)

generated by license key generating and verifying system 122. The secure license keys (e.g. 206) are generated in accordance with asymmetric encryption techniques (e.g. RSA algorithms) from public and private key pairs securely stored in association with respective licensee information in a license key database 204 to enable secure license key generation and for identifying a license associated with the component applications as described further.

Mobile devices 102 communicate in and through wireless network equipment 104. In the example embodiment of FIG. 1, wireless network 104 is a Third Generation (3G) supported network based on Code Division Multiple Access (CDMA) technologies. In particular, wireless network 104 is a CDMA2000 network which includes fixed network components coupled as shown in FIG. 1. Wireless network 104 of the CDMA2000-type may include a Radio Network (RN), a Mobile Switching Center (MSC), a Signaling System 7 (SS7) network, a Home Location Register/Authentication Center (HLR/AC), a Packet Data Serving Node (PDSN), an IP network, and a Remote Authentication Dial-In User Service (RADIUS) server (all not shown). SS7 network is communicatively coupled to a network such as a Public Switched Telephone Network (PSTN) to enable voice communications whereas IP network is communicatively coupled to a network such as the Internet to enable particular data communications, Wireless network 104 is exemplary and persons of ordinary skill in the art will appreciate that other wireless network architectures and standards may be used.

The wireless link shown in communication system 100 of FIG. 1 represents one or more different channels, typically different radio frequency (RF) channels, and associated protocols used between wireless network 104 and mobile device 102. Those skilled in the art will appreciate that a wireless network in actual practice may include hundreds of cells depending upon desired overall expanse of network coverage. All pertinent components may be connected by multiple switches and routers (not shown), controlled by multiple network controllers.

Those skilled in the art will appreciate that wireless network 104 may be connected to other systems, possibly including other networks, not explicitly shown in FIG. 1. Though a CDMA wireless network 104 is described, network 104 may conform to any of the wireless network technologies and protocols including cellular, wide-area network, GSM, GPRS, CDMA, iDEN™, Mobitex™, etc.

Mobile devices 102 are typically multi-tasking wireless communications devices configured for sending and receiving data such as electronic mail, instant messages, SMS messages, and other data messages and, at least some, are configured for making and receiving voice calls. To provide a user-friendly environment to control the operation of mobile device 102, an operating system (not shown) resident on device 102 provides a user interface such as a graphical user interface (GUI) having a main screen and a plurality of subscreens navigable from the main screen.

As well in the present embodiment, the mobile devices include a runtime environment for providing services to and for running component applications for communicating with data sources such as data sources 112, 116 and 120.

Data sources may include applications having programmatic interfaces exposed for communication with other applications in accordance with service-oriented architectures (e.g. Web service protocols). Such services are typically but not necessarily subscription-based.

Communications between mobile devices 102 and the data sources are facilitated by wireless component application gateway system 108. Though not shown, gateway system 108 comprises a component application gateway, a component application provisioning server and a component application discovery server. The component application gateway is useful for proxying the services offered by the data sources to the mobile devices, mapping communications between wireless and wire-line protocols for example.

The discovery server enables a mobile device to locate new or updated services and obtain associated component applications from the component repository 106 via the provisioning server.

Applications may be are stored in component repository 106 as a collection of packages, or bundles. The packages are typically created by an application developer using a design tool provided by an application development environment sometimes referred to as an IDE. The IDE typically provides support for a drag-and-drop graphical approach for visual design of application components including screens, data elements, messages and application workflow logic, as further defined below. Application packages are preferably represented by structured data (XML) that can be generated automatically by the IDE through an automatic code generation process. The design tool further enables the automatically generated code to include or be otherwise augmented by an industry standard scripting language (e.g. JavaScript) or other scripting/programming languages known in the art. The availability of application packages in the repository 106 is published in a registry via a discovery service provided by the discovery server. It is recognized that there can be more than one repository 106 and associated registries used by the gateway server.

Programmers may extend services to mobile devices by programming component applications via stations 110, 114 and 118 adapted with IDEs as described. In one embodiment, such IDEs may be structured as a set of plug-ins to a generic integrated design environment framework, such as, for example, the Eclipse™ framework. Eclipse™ is a well-known development environment, and these and other features are thoroughly described at www.Eclipse.org. Alternately, the tool can be configured as a complete design framework without using a plug-in architecture. For exemplary purposes only, the tool will now be described as a plug-in design environment using the Eclipse™ framework.

Referring to FIG. 2, an IDE 216 for designing component applications is illustrated generally. In the present embodiment, the designer tool is implemented using Eclipse™. Eclipse™ is designed to support the construction of a variety of tools for application development. Further, Eclipse™ supports an unrestricted set of tool providers, including independent software vendors (ISVs) as well as tools for manipulating arbitrary content types (for example HTML, Java, C, JSP, EJB, XML, and GIF). Eclipse™ supports both GUI and non-GUI-based application development environments. The IDE is adapted as further described below to include a secure tag inserter for including a secure tag in published applications.

In the present embodiment, IDE 216 is used to enable a developer to define a component application. A component application is an application defined generally by a structured set of components, including data components, message components, presentation components and workflow components. The components are defined using a structured language and executed on a client device by an intelligent runtime container.

The data components define data entities that are used by the component application program. Examples of data entities include orders, users, and financial transactions. Data components define what information is required to describe the data entities, and in what format the information is expressed. For example, the data component may define an order comprising a unique identifier for the order which is formatted as a number, a list of items which are formatted as strings, the time the order was created which has a date-time format, the status of the order which is formatted as a string, and a user who placed the order which is formatted according to the definition of another one of the data components. Since data elements are usually transferred by message, there is often persistence of data components in a database. Data components may be dynamically generated or defined by the application designer.

The message components define the format of messages used by the component application program to communicate with external systems such as the Web service. For example, one of the message components may describe a message for placing an order, which includes a unique identifier for the order, a status of the order, and notes associated with the order.

The presentation components define the appearance and behaviour of the component application program as it is displayed to a user via a user interface. The presentation components can specify graphical user interface (GUI) screens and controls and actions to be executed when the user interacts with the component application. For example, the presentation components may define screens, labels, edit boxes, buttons and menus, and actions to be taken when the user types in an edit box or pushes a button.

The workflow components of the component application program define processing that occurs when an action is to be performed, such as an action specified by a presentation component as described above, or an action to be performed when messages arrive. Presentation workflow and message processing are defined by the workflow components. The workflow components are written as a series of instructions in either structured data, a programming language, or a scripting language. The workflow component supports a correlation between message components and defines application flow as a set of rules for operations on other components.

More details regarding component applications can be found in Patent Cooperation Treaty Application Numbers PCT/CA2003/001976 entitled, "System and Method for Building and Execution of Platform-Neutral Generic Services Client Applications" and published as WO2004059938; PCT/CA2003/001980 entitled, "System and Method of Building Wireless Component Applications" and published as WO2004059957; and PCT/CA2003/001981 entitled, "System and Method of Creating and Communicating with Component Used Wireless Applications" and published as WO2004059939, each of which is assigned to the owner of the present application.

As service-oriented protocols are primarily defined for wired network communications, a component application-based architecture, in which a component application gateway system proxies a data source on behalf of mobile devices, provides numerous efficiencies. Services often handle sensitive communications (commercial transactions, private information, etc.). Thus a mechanism to identify the license for software used to create the component application programming, which may further the identifying of a particular licensee, enhancing trust within the system 100, is highly desired.

Figure 3:
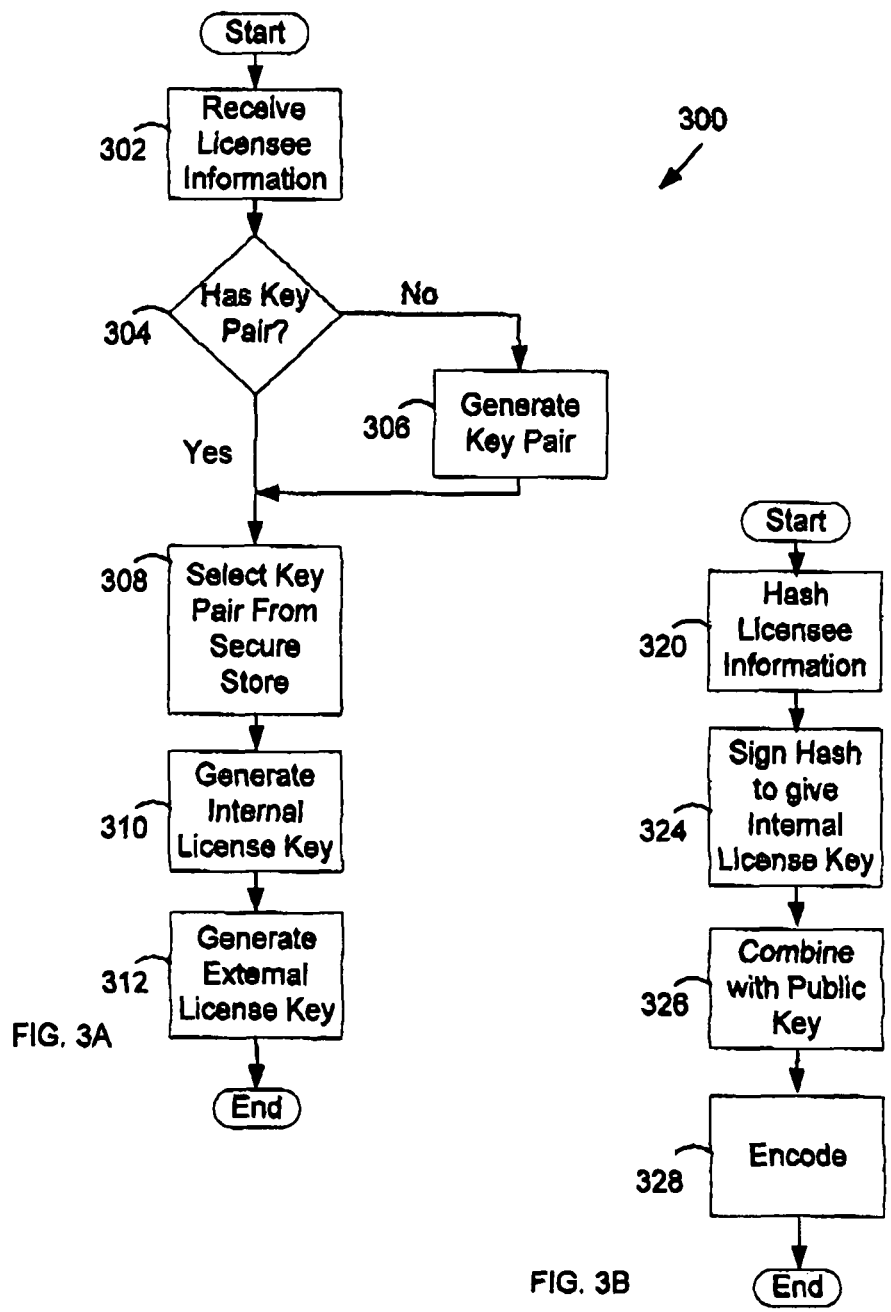
FIGS. 3A and 3B are flowcharts of operations in accordance with an embodiment for generating an external license key such as the key of FIG. 2.

FIG. 3A illustrates a flow of operations 300 for generating an external license key 206 such as by using license key generator/verifier 202 and database 204. License key generator/verifier employs asymmetric encryption techniques involving secret private key and corresponding public key pairs to encrypt data. Such encryption techniques are known in the art and commercial embodiments are available from RSA Security Inc. among others. Key pairs are associated to a licensee for creating unique and therefore traceable license keys as further described, A particular licensee may be associated with more than one key pair, if desired.

At step 302 licensee information is received (e.g. by inputting into the generator/verifier by a license key administrator). The information typically includes the licensee name (e.g. company and individual contact), address, number of licenses required, etc. At step 304 a determination may be made as to whether there is an encryption key pair established for the licensee. Database 204 may be queried for such information. If there is no pair, via branch to step 306, a key pair is generated. It is understood that a pool of previously generated key pairs may be available such that generation involves selecting a pair from the pool. Otherwise, generation algorithms may be performed to create a new key pair. The key pair is stored in association with the licensee in database 204. At step 308 a key pair is selected from the secure store (database 204). The secure store or database may be used as a pool of key pairs and an administrator can select one of the key pairs to define a license key for a licensee. Different licensees may be associated with the same key pair as desired.

With the selected key pair at step 308, an internal license key 212 (i.e. a data component) is created at step 310 and an external license key 206 is created at step 312. The external license key is recorded in the database and is distributed to the licensee for installing an IDE (e.g. 216) on the licensee's programming station (e.g. 110) under the control of a license key verifier 214.

In accordance with one embodiment, the external license key 206 comprises the internal license key 212, a public key component 210 of the licensee's private/public key pair and a public key length block 208 delimiting the data component 206 (see FIG. 2). In accordance with one embodiment, the internal license key comprises a unique identification data digitally signed by the license key generator/verifier.

FIG. 3B illustrates one embodiment of operations 310 and 312 for generating internal and external license keys. At step 320, licensee information is selected to define a message for encoding using a hash function such as (MD5 or SHA-1) to generate a data output unique (for all practical purposes) to the message. The hash output is signed using the private key of the key pair in accordance with techniques that are well-known to persons of ordinary skill in the art. This signed hash is thus unique to the message and the private key used to create it.

The signed hash may define an internal license key 212 that is combined (e.g. concatenated) with the public key 210 corresponding to the private key and the data length 208 of the public key to generate the external license key 206. The external license key 206 is preferably encoded for easy electronic storage or distribution such as by encoding as a string of characters using encoding methods such as Base64, etc. well-known in the art.

The external license key 206 may be distributed together (i.e. at the same time) with the licensed software to be installed or unlocked (e.g. IDE 216) or separately. Distribution (represented by dashed lines in FIG. 1) may be electronic, such as by transmission via a network over carrier signals, or by distribution on physical media such as CD/DVD, firmware, dangle or other product. It is understood that distribution is intended to be point-to-point whereby a licensee receives its and only its intended license key.

Figure 4:
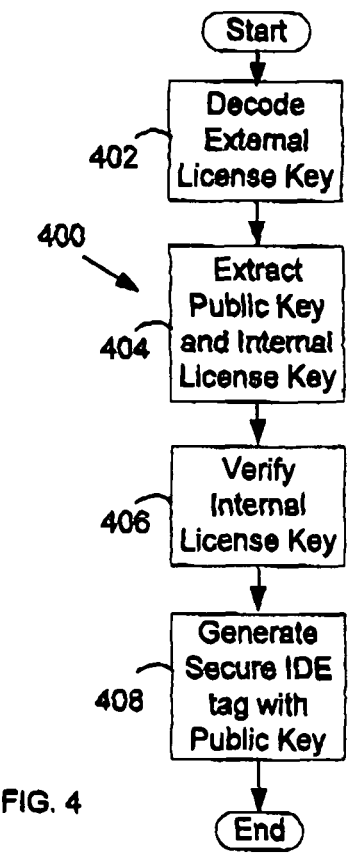
FIGS. 4 and 5 are flowcharts of operations in accordance with an embodiment showing how an external license key can be used for distributing computer software and for tracing use thereof in a distributed computer system such as is shown in FIG. 1.

FIG. 4. illustrates operations 400 for verifying the license key and generating a secure IDE tag. At step 402, the external license key is decoded (e.g. from Base64). The public key and internal license key are respectively extracted (step 404). The authenticity of the internal license key is verified at step 406 using the public key as is well-known. For example, the public key is applied to the internal license key to determine the message hash generated by the license key provider (typically the software licensor). The verifier 214 can also hash the same licensee information and compare the two hashes to determine any tampering. The selected licensee information or message may be bundled with the licensed software when sent to the licensee or entered by the licensee during a registration session which in turn forwards the licensee information electronically to system 122 and key generator/verifier 202 which receives and uses the information to generate the license key as described earlier with reference to FIGS. 3A and 3B.

Optionally, though not shown, a trusted third party may verify a public key as is known in the art.

At step 408, a secure IDE tag is generated using the public key. The message hash is encrypted using the public key to define a tag. The tag is inserted into output of the licensed software for purposes of traceability.

In the embodiment of FIGS. 1 and 2, the licensed software is an IDE 216 useful for programming (i.e. defining and expressing such as my writing code and/or data) other software, Output therefrom comprises component application artifacts (e.g. component definitions, data, scripts, UI etc.) which are bundled for publishing to a repository 106. The component application bundle may thus include an IDE tag identifying securely and privately the IDE that generated the bundle.

Figure 5:
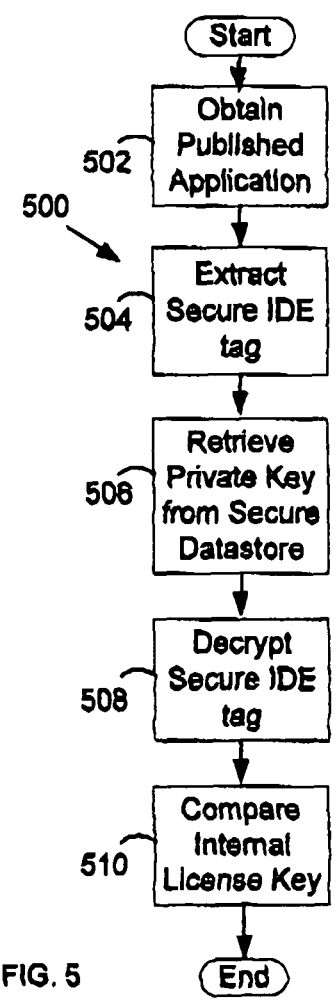

FIG. 5 illustrates operations 500 for tracing a published application. At step 502, the published application is obtained by license key generator/verifier 202 such as by retrieving from repository 106. The secure IDE tag is extracted at step 504 for verification. The verification/identifying may be accomplished as follows. At step 506, using licensee information (which information may not correspond identically to licensee information used to generate a messages as described above) included in the published application or otherwise associated therewith (e.g. at the repository), one or more private keys associated with the licensee in database 204 is obtained. For each candidate private key, the secure IDE tag is decrypted using the private key to obtain the message hash. This message hash may be compared to a hash, generated in real-time for this purpose, of licensee information retrieved from the database 204 or to a hash previously generated and stored to the database 204 such as when the license key was generated. Though not ideally efficient, if likely candidate private key or keys cannot be determined from licensee or other information, steps 506-510 may be repeated with all possible known private keys in the secure data store.

If a license cannot be determined from the secure tag of the output such as via operations 500, the output may be considered as potentially malicious and appropriate action taken. For example, published applications considered malicious may be quarantined and reviewed.

License key management functions 203 may be provided via software for managing database 204, generating various reports of use and other statistics or retrieving specific information stored therein. Such functions may also configure license key generator/verifier 202 enabling a license key administrator to modify license key generating and verifying algorithms to classify or group license keys.

Though FIG. 2 illustrates only licensee information and private/public key pairs stored in association in database 204, other information may be stored. For example, a hash algorithm reference indicating which algorithm was used for a particular license key generation may be stored for each licensee key pair. The generated message hash or internal license key and/or external license key may also be stored. The private/public key generation/verification algorithms may also be stored as can be time and date information for keys and registration, etc.

Though illustrated as separate components with bright line distinctions, persons of ordinary skill in the art will appreciate that operations may be shared among various software components or overlapped and such component distinctions may be artificial.

Though described with reference to generating component applications for system 100, persons of ordinary skill in the art will appreciate that the teachings herein lend themselves easily to other IDE software, tools or applications (e.g. word processing, graphics CAD/CAM, publishing, etc.) whereby secure tags may be generated for inclusion in other outputs of such software for traceability. Secure license key generation and verification features described herein and/or license key management features may be employed in scenarios which do not require secure tags for tracing as well.

A symmetric encryption approach has a serious disadvantage because the same algorithm is used in both license key generator and verifier code, which presents a security threat. In the asymmetric approach, an asymmetric encryption algorithm (e.g. RSA) is employed to generate a public and private key pair. The private key is kept by the software licensor in a secure place. This private key is used to generate the license key for licensees, while the public key is attached with the installer for the licensed software and is used to validate licensee's license key during installation. So, even if a hacker knows how to generate and verify the license key, because he/she doesn't have the private key, he/she still can't break our software protection.

Flexibility is also facilitated by the license key solution described. If the public key is hard-coded in the installer rather than supplied with the license key, it is difficult to change the private and public key pair in the future, as an old installer cannot verify a new license key generated from a new private key. In accordance with an embodiment of the license key solution, an innovative solution can address this problem. The license key (referenced herein as an "internal license key") is combined with its corresponding public key, whose counterpart private key is used to generate the license key, to form an "external license key" encoded in Base64 format. Consequently, the relationship between a public/private key pair and a licensee is recorded in a database in a license key management system. The external license key is then provided to the licensee. During installation, the software installer extracts the public key and internal license key from external license key, and verifies the license key. This flexible approach enables the licensor to select different public/private key pairs to generate license keys for different end users or different group of licensees.

In certain situations where the licensed software creates outputs which may be obtained for review, traceability provides the licensor an ability to trace the output back to the licensed software (to one or a known group of software copies) that created it. A straightforward approach is to include an external license key in the output of the licensed software. But this solution may be problematic. Circulating an external key may enable a malicious developer to generate output using another developer's information which could not be appropriately traced. It may provide an exploit for an attacker, as the attacker can obtain a licensee's external license key from the published application and guess the licensee's user name and company name etc. to pretend to be the licensee to install a copy of the licensed software and use it to create output such as publishing component applications.

In an embodiment of the license key solution as proposed, during installation of the licensed software, the extracted public key is used to encrypt data from the internal license key, and the resulting byte stream, termed a "secure IDE tag" or more generically a "secure tag", is stored for use by the licensed software. When licensees create output, particularly output for sending to or for use by others, such as by publishing a component application through an IDE, the secure tag is embedded in the published application output. By decrypting the secure tag with a corresponding private key held by licensor, and comparing with message data of an internal license key, the licensor ray easily know who created and published the application.

Through an integrated management function of the license key management system, the licensor can easily create reports, such as how many license keys have been issued, how many licensees are in the database, when the license key was generated, when the licensee was registered, and so on.

The above-described embodiments of the present application are intended to be examples only. Those of skill in the art may effect alterations, modifications and variations to the particular embodiments without departing from the scope of the application. The subject matter described herein in the recited claims is intended to cover and embrace all suitable changes in technology.

What is claimed is:

1. A method for providing a secure license key for a license controlling software use, the method comprising:
    recording an association between a public and private key pair and a licensee at a database of a license key management system;
    generating, at a processor, an internal license key for the license, the internal license key comprising a message signed by the private key associated with the licensee, and the internal license key being verifiable with the public key;
    generating an external license key comprising the internal license key and the public key; and
    providing the external license key to a software enabler configured for receiving the external license key, extracting the public key and the internal license key therefrom and verifying the internal license key for enabling use of licensed software associated with the licensee;
    wherein the software enabler enables the use of the licensed software once the internal license key is verified.

2. The method according to claim 1 including storing the public and private keys in association with licensee information for a licensee licensed to use the software.

3. The method according to claim 1 comprising providing the software enabler, the enabler comprising a software installer bundled with the licensed software.

4. The method according to claim 1 comprising providing the software enabler separately from the public key and the internal license key.

5. The method according to claim 1 further comprising:
    receiving a secure tag using the public key and the internal license key, the secure tag comprising a byte stream created by using the public key to encrypt data of the internal license key;
    wherein the secure tag is incorporated with an output of the licensed software.

6. The method according to claim 5 comprising identifying the license associated with the output using the secure tag by tracing the origin to a particular licensed software which created the output.

7. The method according to claim 6 comprising storing the public and private keys in association with licensee information for a licensee licensed to use the licensed software and wherein identifying comprises using the private key associated with the licensee to decrypt the secure tag.

8. The method according to claim 5 wherein the licensed software comprises software configured to program component applications.

9. The method according to claim 1 comprising receiving licensee information for a licensee to be enabled to use the licensed software and defining the message using at least some of the licensee information.

10. A license key management system comprising:
    a license key generator including a memory and a processor, the memory having instructions stored thereon, which, when executed in the processor, cause the processor to :
    record an association between a public and private key pair and a licensee at a database of a license key management system;
    generate an internal license key, the internal license key comprising a message signed by the private key associated with the licensee, and the internal license key being verifiable with the public key; and
    provide an external license key to a software enabler adapted to receive the external license key and verify the internal license key for enabling use of the licensed software associated with the software enabler for the licensee, the external license key comprising the internal license key and the public key;
    wherein the software enabler enables the licensed software once the internal license key is verified; and
    the database for storing the internal license key and respective private/public key pairs in association with respective licensee information for licensees licensed to use the licensed software.

11. The system according to claim 10 comprising a management component adapted to generate management reports about the use of the system.

12. The system according to claim 10 comprising an internal license key verifier adapted to receive output from software and to identify a license using a secure tag incorporated with the output, the secure tag generated from the internal license key and the public key provided for enabling licensed software.

13. The system according to claim 10 wherein the internal license key generator selects public and private key pair from a pool of such key pairs to generate the internal license key for a particular license.

14. A computer program product comprising a computer readable medium embodying instructions and data executable by a computer, which when executed by the computer cause the computer to:
    record an association between a public and private key pair and a licensee at a database of a license key management system;
    generate an internal license key for a license, the internal license key comprising a message signed by a private key associated with the licensee, and the internal license key being verifiable with the public key;
    provide an external license key to a software enabler adapted to receive the external license key and verify the internal license key for enabling use of licensed software associated with the software enabler, the external license key comprising the internal license key and the public key, wherein the software enabler enables the licensed software once the internal license key is verified; and store the public and private key pair in association with licensee information for the licensee licensed to use the software.

15. The computer program product according to claim 14 wherein the instructions and data are executable by the computer to select a public and private key pair from a pool of such key pairs to generate the internal license key for a particular license.

16. The computer program product according to claim 14 wherein the instructions and data are executable by the computer to receive licensee information for a particular license and store the licensee information in association with the internal license key.

17. The computer program product according to claim 14 wherein the instructions and data are executable by the computer to use the licensee information to define the message to be signed.

18. The computer program product according to claim 14 wherein the software enabler is adapted to generate a secure tag using the public key and the internal license key, the secure tag to be incorporated with output of the licensed software for identifying the particular license for the licensed software; and wherein the instructions and data are executable by the computer to identify the particular license using a particular secure tag.

19. The computer program product according to claim 14 wherein the licensed software comprises software for programming component applications.

20. The computer program product according to claim 14 wherein the instructions and data are executable by the computer to provide internal license key administration reports.

21. The method of claim 1 wherein the external license key further comprises a public key length block delimiting the data length of the external license key.

22. The system of claim 10 wherein the external license key further comprises a public key length block delimiting the data length of the external license key.

23. The system of claim 10, wherein the private and public keys are generated in conformance with asymmetric encryption techniques.

24. The method of claim 1, wherein the private and public keys are generated in conformance with asymmetric encryption techniques.

* * * * *